United States Patent [19]

Muramatsu et al.

[11] Patent Number: 5,427,443
[45] Date of Patent: Jun. 27, 1995

[54] ANNULAR ELASTIC TRACK

[75] Inventors: Tateo Muramatsu; Masaru Ishibashi, both of Yokohama, Japan

[73] Assignee: Bridgestone Corporation, Tokyo, Japan

[21] Appl. No.: 158,287

[22] Filed: Nov. 29, 1993

[30] Foreign Application Priority Data

Nov. 27, 1992 [JP] Japan ................................. 4-339532
Sep. 10, 1993 [JP] Japan ................................. 5-249949

[51] Int. Cl.⁶ ............................................. B62D 55/24
[52] U.S. Cl. ........................................ 305/38; 305/6; 305/53; 305/35 R
[58] Field of Search ...................... 301/5.1; 152/1, 5; 305/6, 7, 35 R, 35 EB, 38, 39, 53, 60; 280/205

[56] References Cited

U.S. PATENT DOCUMENTS

| 4,217,006 | 8/1980 | Dehnert | 305/38 X |
| 4,378,133 | 3/1983 | Trautwein | 305/38 X |
| 4,407,550 | 10/1983 | Lapsys | 305/38 X |
| 4,449,627 | 5/1984 | Kell | 305/35 EB |
| 4,474,414 | 10/1984 | Tokue | 305/38 X |
| 4,957,332 | 9/1990 | Batelaan | 305/39 |

FOREIGN PATENT DOCUMENTS

| 438805 | 8/1948 | Italy | 305/39 |
| 55065 | 4/1980 | Japan | 305/56 |
| 114074 | 4/1990 | Japan | 305/35 R |
| 5039068 | 2/1993 | Japan | 305/38 |
| 14036 | of 1852 | United Kingdom | 305/60 |
| 1643295 | 4/1991 | U.S.S.R. | 305/39 |

Primary Examiner—Russell D. Stormer
Attorney, Agent, or Firm—Sughrue, Mion, Zinn, Macpeak & Seas

[57] ABSTRACT

An annular elastic track having sprocket-driven protrusions on the inner circumference and lugs on the outer circumference. The annular elastic track comprises a plurality of annular thin plates spaced radially from one another with a predetermined interval and embedded in layers in the track in its circumferential direction. The annular thin plates are a plurality of concentric annular plates having different diameters or a spirally formed single thin plate. Such an annular elastic track is used for vehicles as well as a monocycle comprising a flat plate-shaped cross-section, at least two external rollers arranged outside the annular elastic track for applying a load onto it, at least one internal roller arranged inside the annular elastic track to hold the track by these internal and external rollers therebetween, and crank device including pedals provided inside the annular elastic track for driving one of said external and internal rollers.

13 Claims, 19 Drawing Sheets

FIG_4a (Detail of "C")
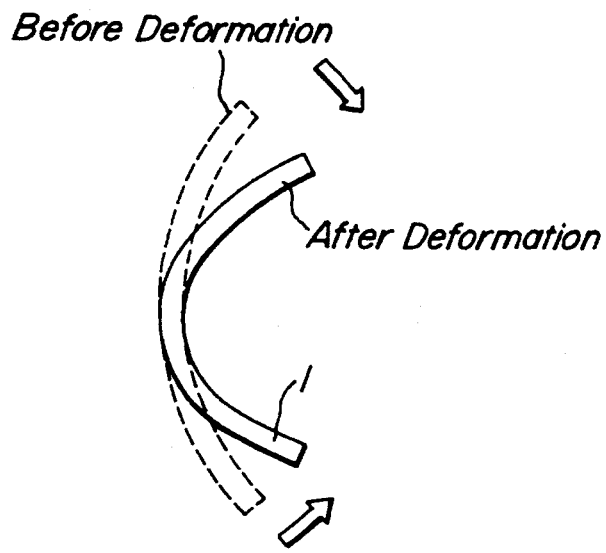
Before Deformation
After Deformation
FIG_4b (Detail of "D")
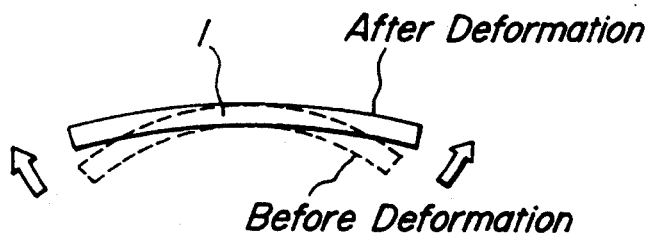
After Deformation
Before Deformation
FIG_4c (Detail of "E")
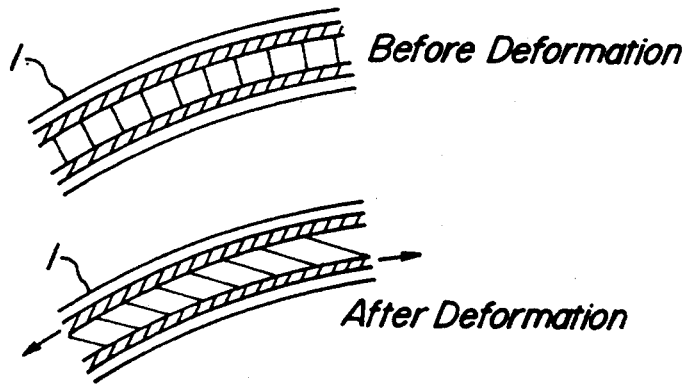
Before Deformation
After Deformation FIG_7
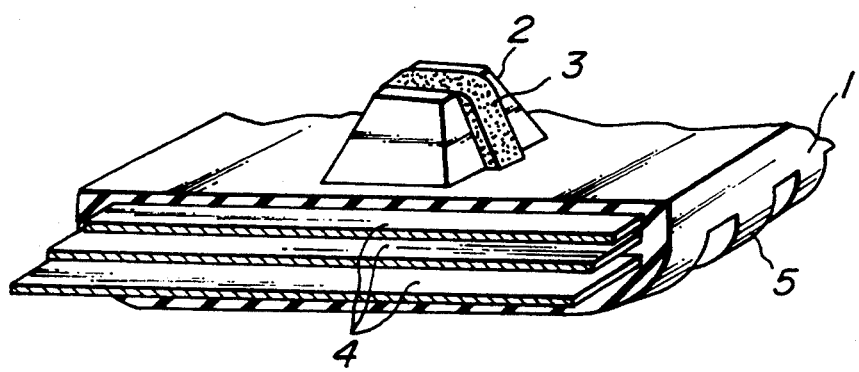
FIG_8
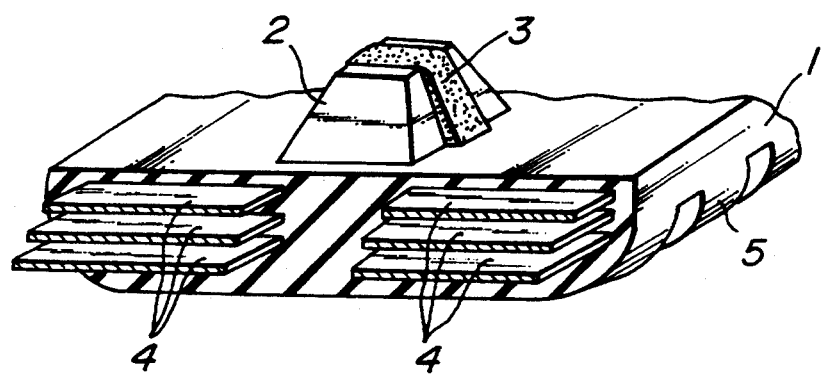

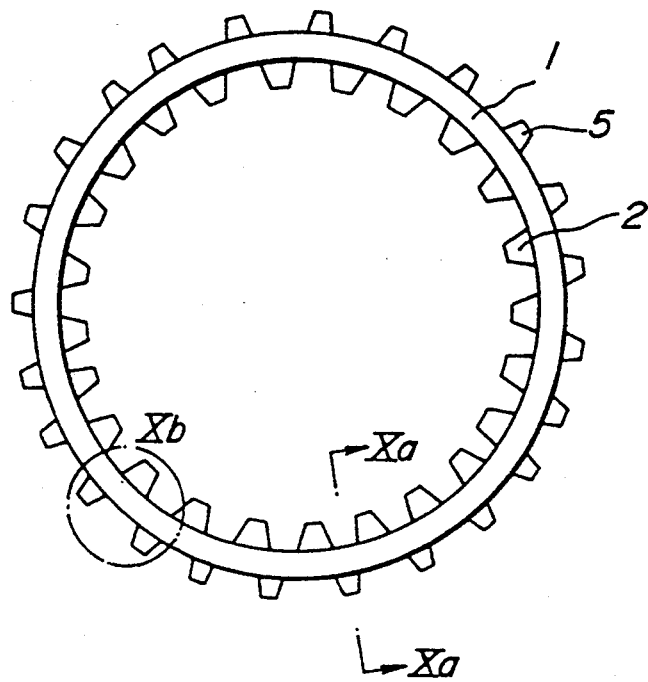
FIG._9
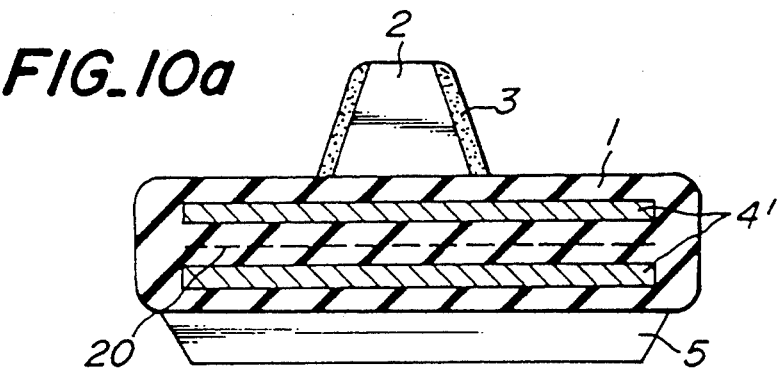
FIG._10a
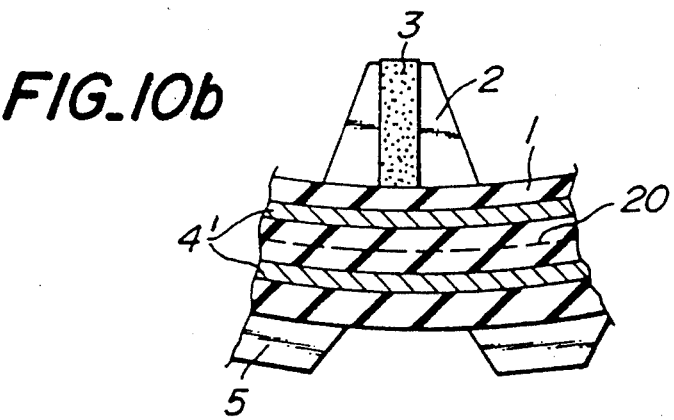
FIG._10b

FIG_11a
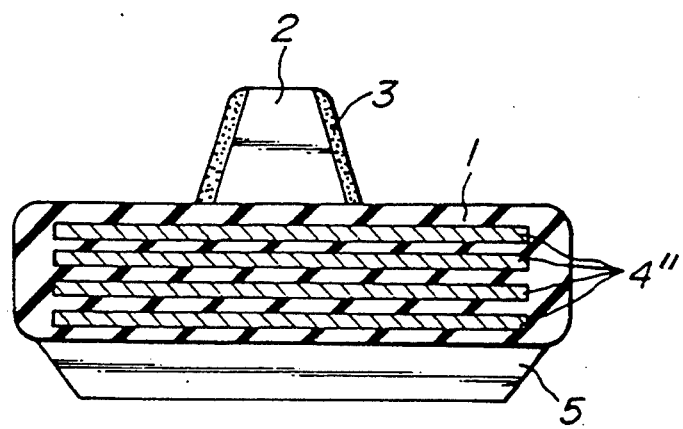
FIG_11b
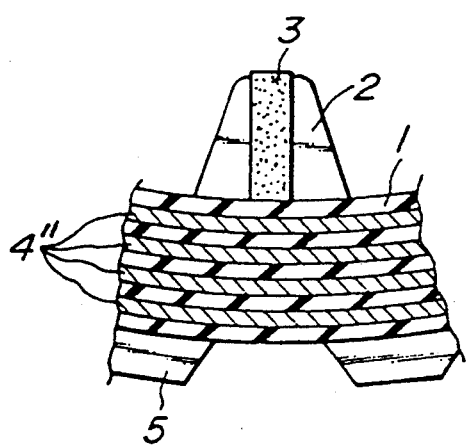

FIG_12
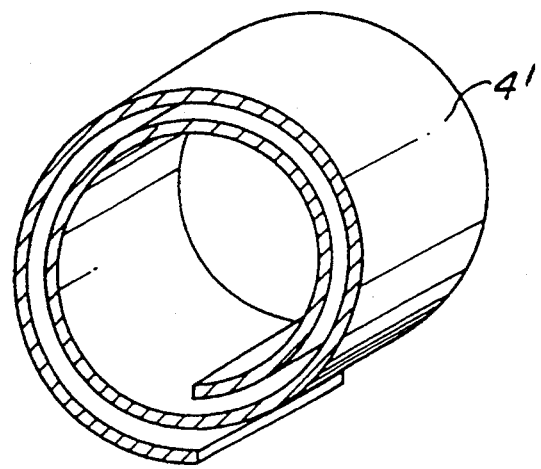
FIG_13
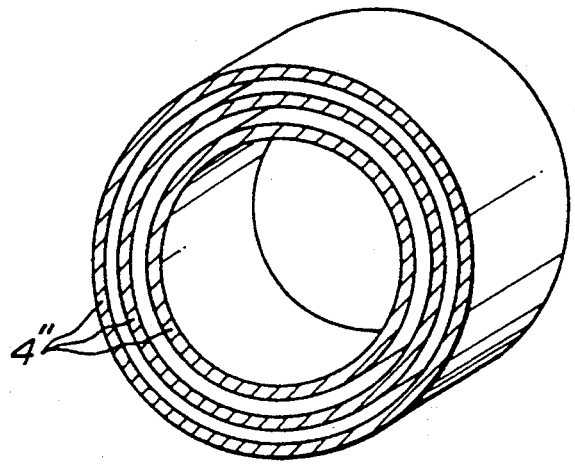

FIG._14a
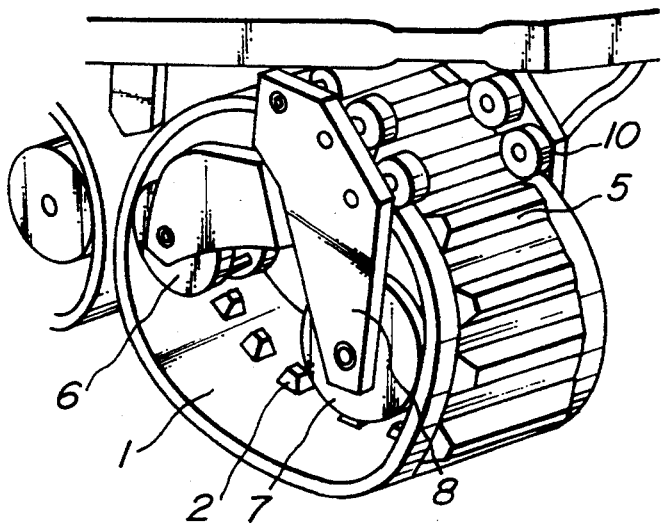
FIG._14b
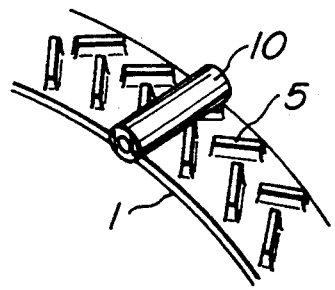
FIG._14c
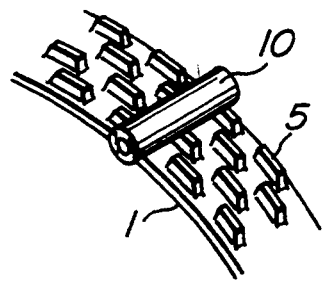
FIG._14d
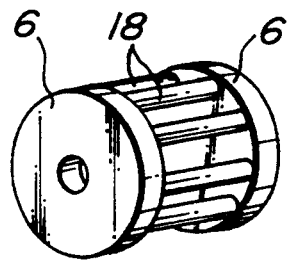
FIG._14e
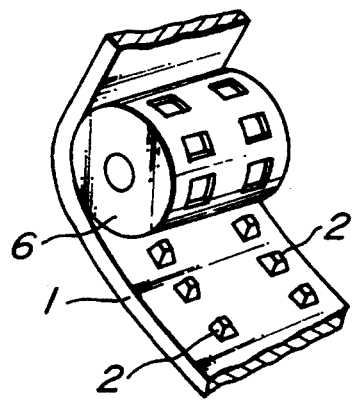

FIG_15
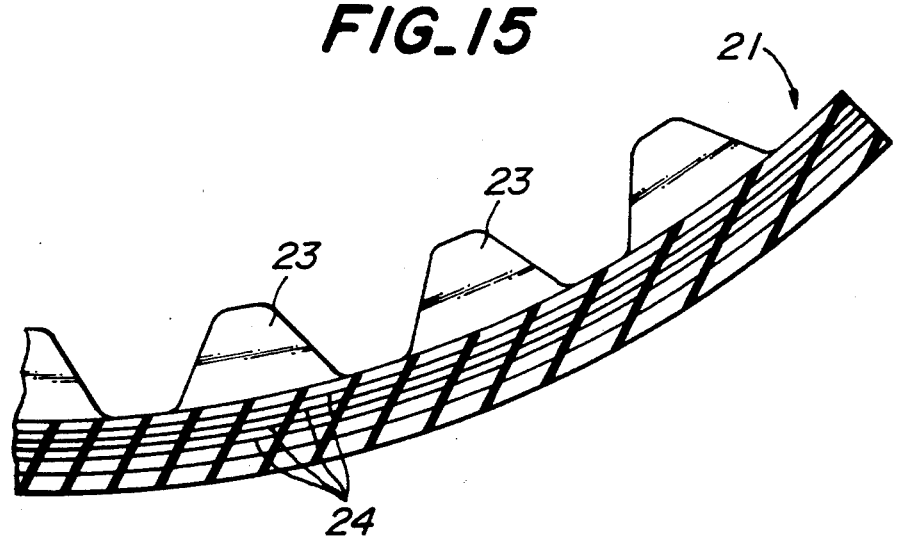
FIG_16
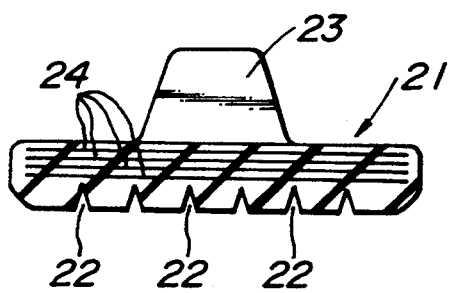

FIG_17
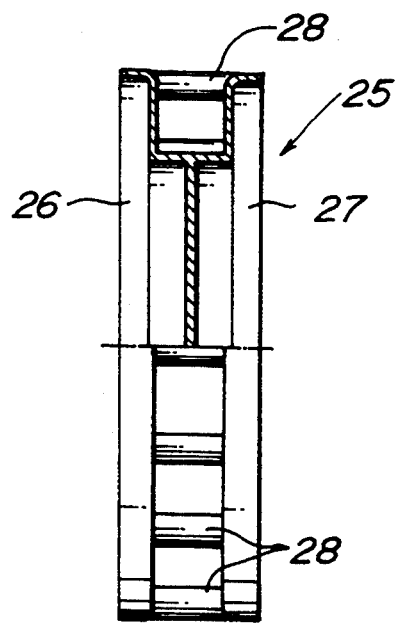
FIG_18
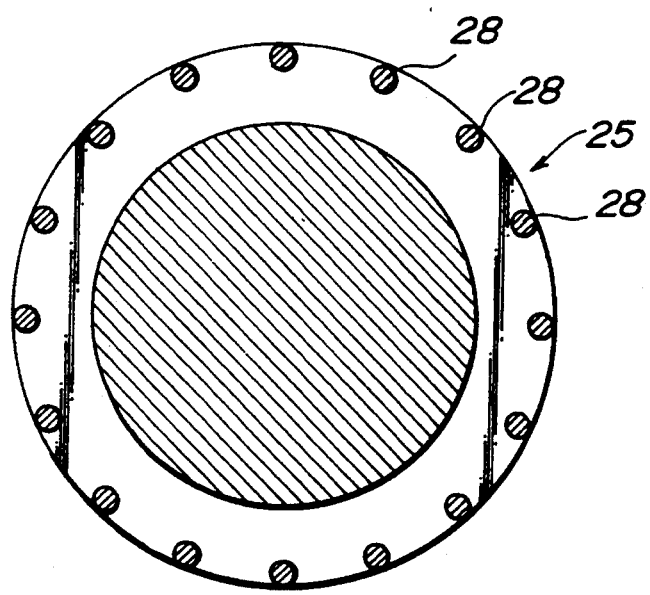

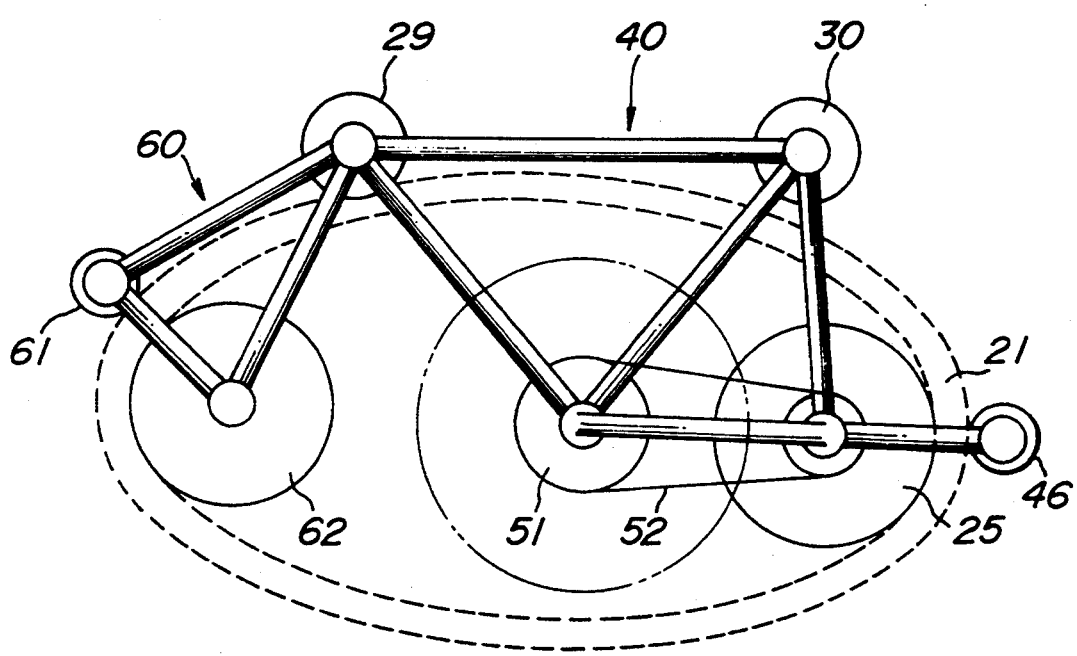
FIG_25

FIG._26
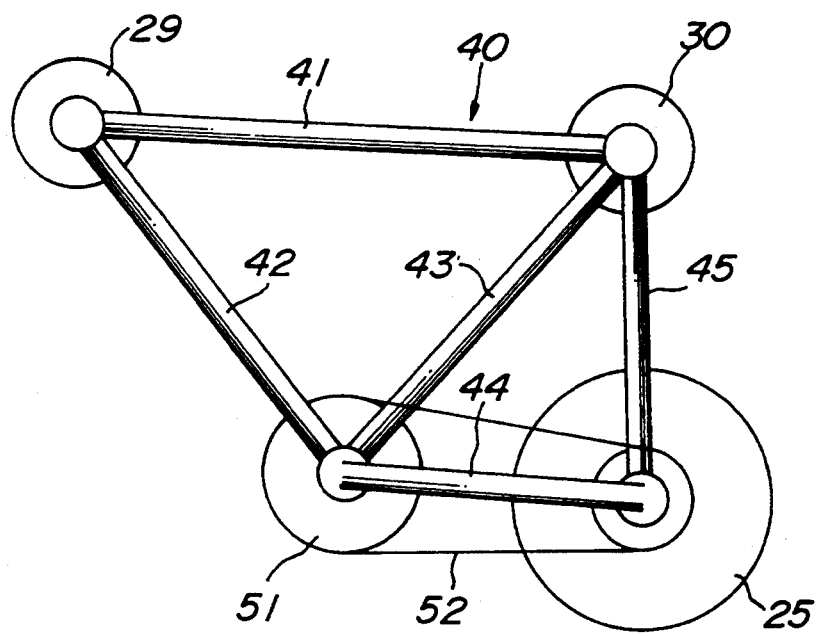
FIG._27
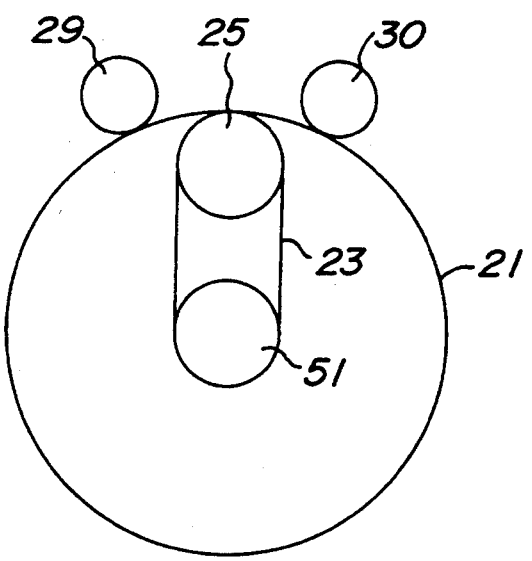

ANNULAR ELASTIC TRACK

This invention relates to an annular elastic track for use in vehicles for civil engineering, construction works and agriculture works or for leisure or sports such as monocycles, which is able to be reasonably driven and are simple in construction and durable in use, keeping appropriate rigidity, and more particularly to a monocycle using such an annular elastic track.

In vehicles for civil engineering and construction works and agriculture works, annular endless elastic tracks 1 have been used as shown in FIG. 1. Such tracks 1 are mounted on the lower body of a vehicle 12 and deformed into an elliptical shape in use. When the annular elastic tracks 1 are mounted on the vehicle, its load is applied to the tracks 1 on its outside, that is, from above through stationary rollers 9 provided at the lower part of the vehicle body and load rollers 10 journaled on rockable arms 8. The rockable arm 8 is pivotally connected to the vehicle body by means of a pivot shaft 19 and urged downward by means of springs. The rockable arm 8 is swung upward about the pivot shaft 19 by the force in the annular elastic track 1, causing it to be restored to its original shape. When the annular elastic tracks 1 are deformed into the elliptical shape by the load from the vehicle 12, driven sprockets 7 are moved away from driving sprockets 6 of the vehicle 12.

The load rollers 10 are arranged outside the annular elastic track 1, in a manner such that they are remote from the driven roller 7 as shown in FIG. 2a or at least one of the load rollers is in opposition to the driven roller 7 as shown in FIG. 2b. Schematically simplified drawings FIGS. 3a and 3b illustrate the annular elastic track 1 mounted on the service car in use shown in FIGS. 1 and 2a and 2b, in order to show the shape of the track 1 when manufactured and the shape when mounted on the vehicle or subjected to the load of the vehicle. The shape of the annular elastic track immediately after manufacture or under the no-load condition is substantially truly circular as shown in dotted lines in FIGS. 3a and 3b, while the shape when mounted on the vehicle 12 as shown in FIG. 1 is deformed in vertical directions by the load F due to the weight of the vehicle as shown in solid lines in FIGS. 3a and 3b.

The portions C and D of the track in FIG. 3b are schematically shown on an enlarged scale in FIGS. 4a and 4b, respectively, wherein the portion C has been deformed from the shape shown in broken lines to that shown in solid lines in FIG. 4a under a bent condition to a smaller radius of curvature, and the portion D has been deformed from the shape shown in broken lines to that shown in solid lines in FIG. 4b under a bent condition in the opposite direction to a larger radius of curvature. Therefore, in addition to the heavy load resulting from the weights of the vehicle and loaded goods, the annular elastic track in use is subjected to repeated bending actions so that it is always under a very severe loaded condition.

In order to overcome such a severe used condition, annular endless elastic tracks have been proposed in U.S. Pat. Nos. 4,378,133; 4,270,811; and 4,269,457, whose one example is shown in FIGS. 5 and 6. The annular endless elastic track 1 is made of a rubber composition and formed with lugs 5 having appropriate shapes with intervals and extending from the surface of the track contacting roads in order to increase the frictional force of the track with roads so as to help in driving a vehicle. Moreover, the annular elastic track 1 includes core bands 13 embedded therein extending in its width directions and spaced in its circumferential direction with a predetermined interval. The core band 13 is primarily made of a fiber reinforced plastic material or the like and has an arcuate cross-section to increase its modulus of section in order to improve its load resistant faculty.

In order to effectively reinforce the core bands 13, the annular elastic track 1 further includes a number of filaments 14 extending in the circumferential direction on inner and outer sides of the core bands 13. Moreover, there are provided set screws at both the edges of the core bands 13 and extending in the width directions from the edges of the track 1. Screw caps 17 are threadedly engaged on the set screws and serve to connect links 15 to form endless chains on both the edges of the track 1. The endless chains are driven by the sprockets 6 engaging the screw caps 17.

Protection flanges 16 are provided as mudguards for the engaging portions of the driving arrangements. In order to maintain the arcuate shape of the core bands 13, tension members in the form of cables may be provided for diagonally connecting the links on both the sides of the track as the case may be.

As shown on the enlarged scale in FIG. 6, the annular elastic track 1 is rotatively driven by the rotating driving sprockets 6 engaging the pins or the screw caps 17 connecting the number of the links 15 to form endless chains at both the edges of the annular elastic track 1. However, as the core bands 13 have to be maintained in an arcuate shape in order to support the heavy weight of the vehicle and resist the severe condition in use as described above, there is a great difficulty to match the core bands 13 with links 15 in their connected positions. Moreover, repeated stresses acting upon the arcuate core bands 13 owing to the heavy load would cause great relative displacements between the annular elastic track 1 and the core bands 13 in the comparatively narrow width area. As a result, separations between the rubber composition and the core bands 13 are unavoidable.

In another aspect, the invention relates to the improvement of monocycles. Recently, monocycle riding has become popular among boys and girls. In general, a monocycle has a tire mounted on an annular steel rim and a seat provided on the axle of the rim.

With such a monocycle of the prior art, as only very small part of the tire contacts a road, it is poor in stability and always requires for a cyclist to balance himself in order to avoid falling down. Moreover, the tire does not have a springy effect in vertical directions, so that it is poor in variety of riding manners and difficult to ride on bumpy roads.

SUMMARY OF THE INVENTION

It is an object of the invention to provide an improved annular elastic track which is simple in construction and ensures the appropriate rigidity of the track, eliminating the complication in construction required to improve the load resistance in the prior art and which is durable in use, precluding any separations between the rubber composition and reinforcements therein and achieves the simple driving system.

In order to accomplish this object, in an annular elastic track having sprocket-driven protrusions on its inner circumference and lugs on the outer circumference, the annular elastic track according to the invention comprises a plurality of annular thin plates spaced radially from one another with a predetermined interval and embedded in layers in the track in its circumferential direction.

According to the invention, the annular thin plates are a plurality of concentric annular plates having different diameters or a spirally formed single thin plate. The annular thin plates are preferably embedded in the track made of a rubber-like material to be covered upper, lower and opposite lateral sides of each of the annular thin plates with the rubber-like material. Moreover, a thickness $t_1$ of the rubber-like material between the annular thin plates is preferably $0.5 \sim 2.0$ times of a thickness $t_2$ of the single annular thin plate. The annular thin plates are preferably made of a glass fiber reinforced plastic material, a carbon fiber reinforced plastic material, or a spring steel. In a preferred embodiment according to the invention, the sprocket-driven protrusions may be provided in plural rows, or provided with low friction members embedded therein so as to reinforce the protrusions to improve the durability.

As can be seen from the above description, the annular elastic track 1 is deformed while being driven and is subjected to repeated bending actions at the portions C and D as shown in FIGS. 3a and 3b and 4a and 4b to cause great shearing deformations. However, these deformations are mainly in circumferential directions of the track 1 so that the rubber between the thin plates is also greatly deformed and there is little deformation in width directions which would be caused in the arcuate core bands of the prior art. It is therefore possible for the annular elastic track to restore its original shape without causing any internal breakage.

Moreover, the annular elastic track according to the invention exhibits the appropriate rigidity and improved durability irrespective of its simple construction by vulcanizing and jointing the rubber and the thin plates made of a glass fiber reinforced plastic material, carbon fiber reinforced plastic material, or spring steel embedded therein to form a unitary track. In the driving system, the annular elastic track according to the invention is provided with simple sprocket-driven protrusions making it possible to use cage-type sprockets or the like as shown in FIG. 14b without driving link chains provided at both edges of the track of the prior art driven by two driving sprockets. According to the invention, it is therefore possible to lower the surface pressure acting upon the elastic track being driven to ensure the reasonable driving without applying any excessive load on the track.

An annular elastic track of the invention may be used in an improved monocycle which eliminates all the disadvantages of the monocycles of the prior art.

In order to accomplish the above object, the monocycle according to the invention comprises an annular elastic track having a flat plate-shaped cross-section, at least two external rollers arranged outside said annular elastic track for applying a load onto it, at least one internal roller arranged inside said annular elastic track to hold the track by these internal and external rollers therebetween, and crank means including pedals provided inside the annular elastic track for driving one of said external and internal rollers.

The annular elastic track of the monocycle according to the invention comprises sprocket-driven protrusions on the inner circumference, and at least one annular thin plate embedded in the track along its entire length.

The monocycle according to the invention uses the flat-shaped annular elastic track deformable to a great extent so that the area of the track contacting a road in use is very wide to provide a good stability of the monocycle which is advantageous in training of monocycle riding for accomplishing rapid mastery of the riding.

The annular elastic track used in the monocycle according to the invention is made of a rubber or a synthetic resin having thin plates made of a fiber reinforced plastic material in layers embedded therein. With such an arrangement, the annular elastic track exhibits a bending rigidity proportional to the cube of the number of the thin plates and is able to be bent to an extent corresponding to that of the single thin plate. Therefore, the annular elastic track used in the monocycle is characterized in its great deformability irrespective of its a great bending rigidity. The annular elastic track is preferably made of a rubber having less internal loss, more preferably having a loss factor ($\tan \delta$) not more than 0.15.

The invention will be more fully understood by referring to the following detailed specification and claims taken in connection with the appended drawings.

BRIEF DESCRIPTION OF THE DRAWINGS

FIG. 2b illustrates modification of the relation shown in FIG. 2a;

FIG. 3b is a simplified side view illustrating the two shapes of the track shown in FIG. 3a;

FIG. 4a illustrating the part C of the track shown in FIG. 3b for explaining the deformed state;

FIG. 4b illustrating the part D of the track shown in FIG. 3b for explaining the deformed state;

FIG. 4c illustrating the part E of the track shown in FIG. 3b for explaining the deformed state;

FIG. 7 is a partial sectional perspective view illustrating an annular elastic track including annular thin plates according to one embodiment of the invention;

FIG. 8 is a partial sectional perspective view illustrating an annular elastic track according to another embodiment of the invention whose annular thin plates are divided on both sides of the longitudinal center line of the track;

FIG. 9 illustrates an annular elastic track according to the first embodiment of the invention substantially circular before mounted on a vehicle;

FIG. 10a is a cross-sectional view of the annular elastic track taken along the line Xa—Xa in FIG. 9;

FIG. 10b is a partial longitudinal-sectional view of the annular elastic track showing the portion Xb in FIG. 9;

FIG. 11a is a cross-sectional view of the annular elastic track according to the second embodiment of the invention;

FIG. 11b is a partial longitudinal-sectional view of the annular elastic track shown in FIG. 11a;

FIG. 12 is a perspective view illustrating a spiral annular thin plate to be embedded in the annular elastic track according to the invention;

FIG. 13 is a perspective view illustrating annular thin plates having different diameters to be embedded in the annular elastic track according to the invention;

FIG. 14a illustrates the annular elastic track according to the invention mounted on a vehicle under a running condition;

FIG. 14b is a partial perspective view illustrating another embodiment of lugs on the outer circumference of the track;

FIG. 14c is a partial perspective view illustrating still another embodiment of lugs;

FIG. 14d is a perspective view illustrating a cage-type sprocket to be used for the track shown in FIG. 14a;

FIG. 14e is a perspective view illustrating a modification of the annular elastic track according to the invention having sprocket-driven protrusions in two rows to engage a drum-type sprocket;

FIG. 15 is a partial enlarged side view of an annular elastic track to be used in a monocycle according to the invention;

FIG. 16 is a sectional view of the track shown in FIG. 15;

FIG. 17 is a partial sectional front view illustrating a sprocket wheel to be used in a monocycle according to the invention;

FIG. 18 is a cross-sectional view of the sprocket wheel shown in FIG. 17 taken along a line perpendicular to its rotating axis;

FIG. 25 is a side view illustrating the monocycle shown in FIG. 23 under a loaded condition of about 120 kg;

FIG. 26 is a side view illustrating the stationary frame of the monocycle shown in FIG. 23;

FIG. 27 is a conceptual view illustrating a monocycle according to the third embodiment of the invention;

DESCRIPTION OF THE PREFERRED EMBODIMENTS

Figure 1:
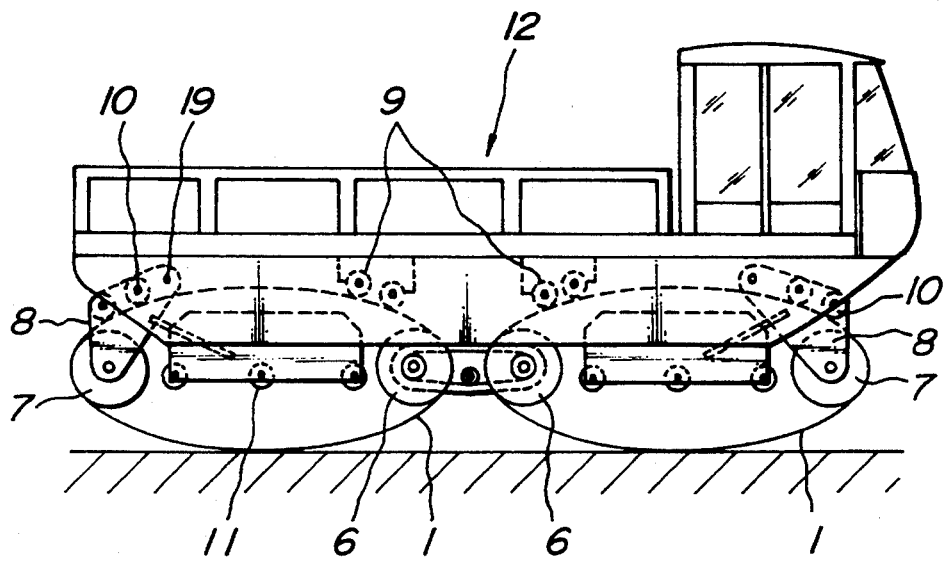
FIG. 1 illustrates a service car having annular elastic tracks in use.
Figure 2A:
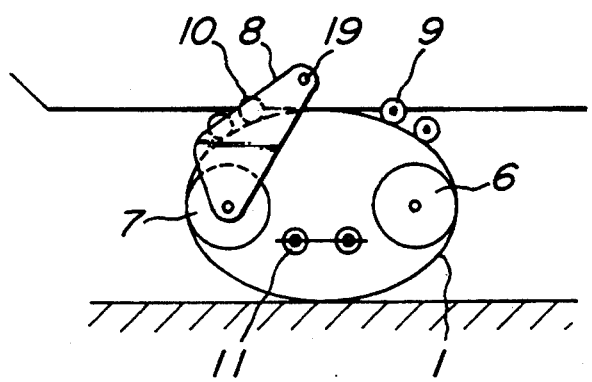
FIG. 2a illustrates a relationship between an annular elastic track, a rockable arm and load rollers of a vehicle using the track.
Figure 2B:
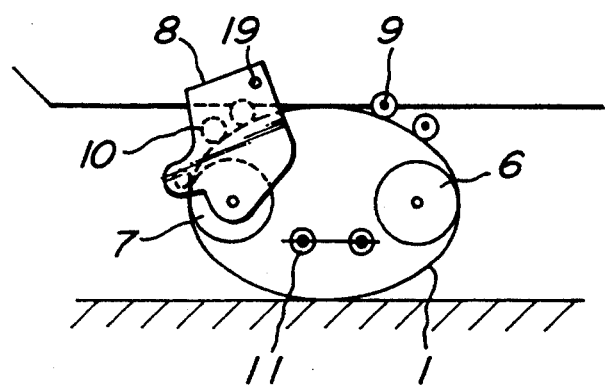
Figure 3A:
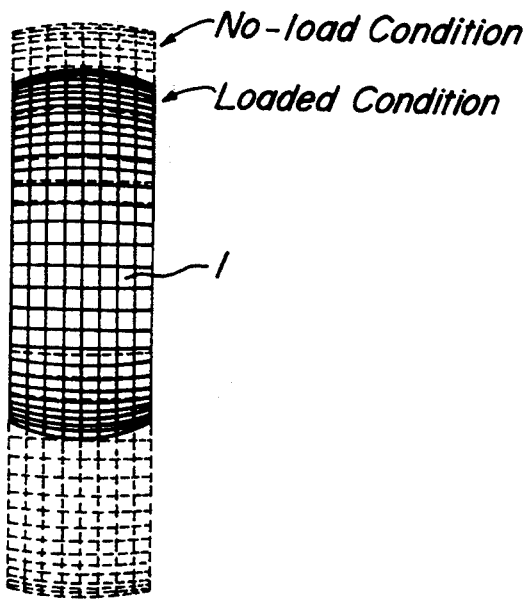
FIG. 3a is a simplified front view illustrating two shapes of an annular elastic track when manufactured and when mounted on a vehicle or loaded by a vehicle weight.
Figure 3B:
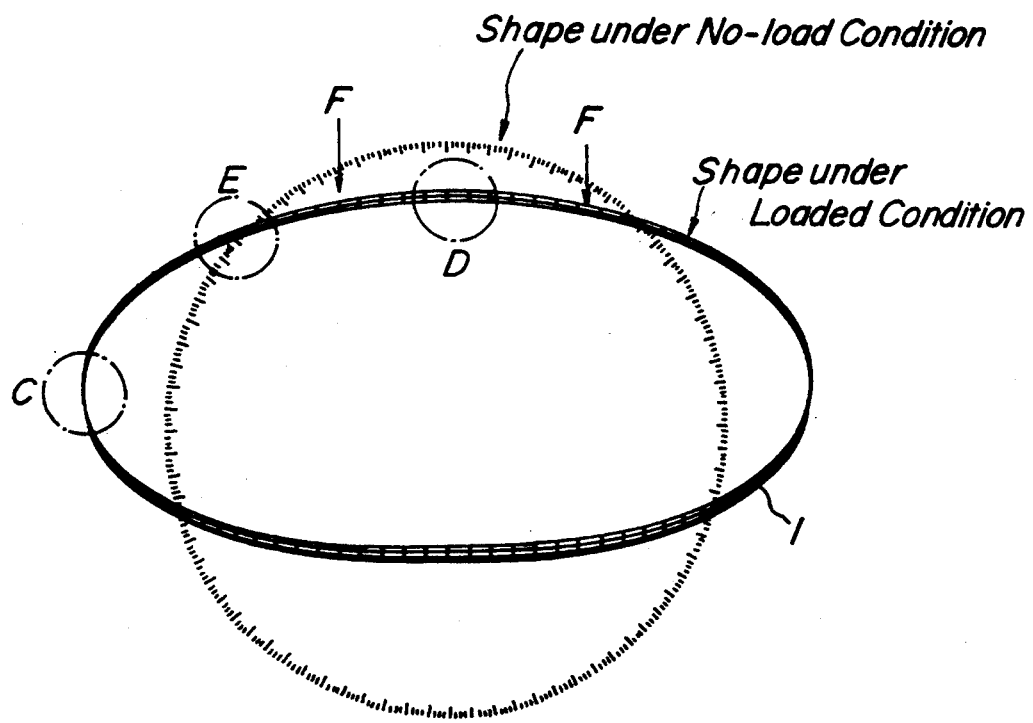
Figure 5:
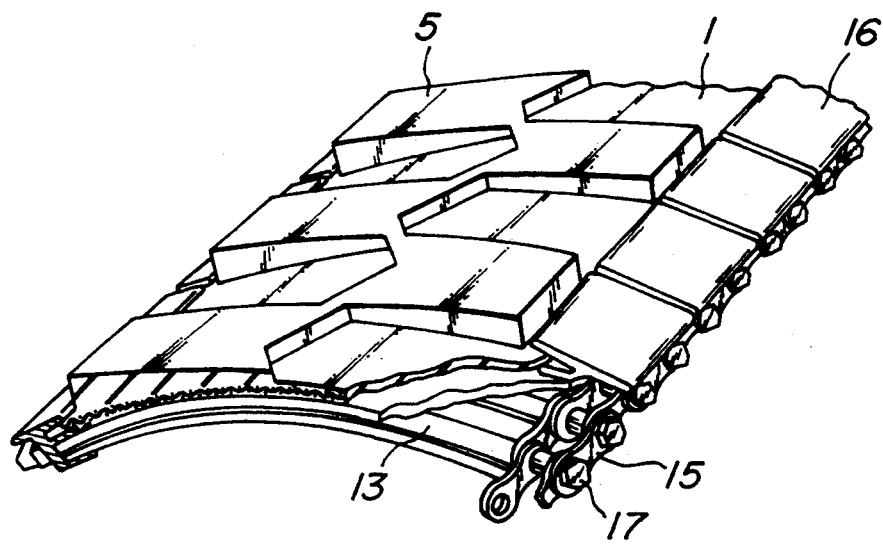
FIG. 5 is a partial perspective view illustrating an annular elastic track of the prior art.
Figure 6:
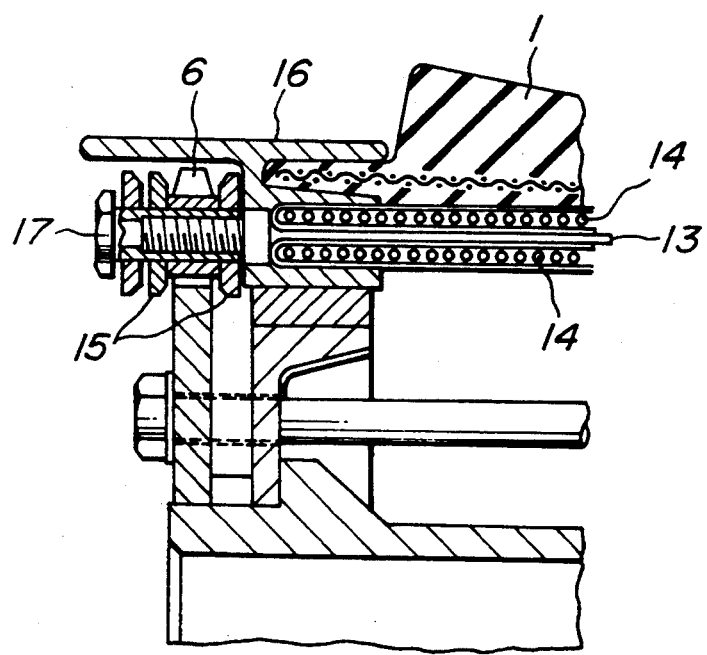
FIG. 6 is a partial sectional view illustrating the driving system between driving sprockets and the annular elastic track shown in FIG. 5.

FIG. 7 illustrates an annular elastic track 1 according to the first embodiment of the invention, which is composed of a rubber composition in the form of an endless ring as shown in FIG. 9 illustrating its entire configuration. The annular elastic track 1 has a plurality of sprocket-driven protrusions 2 on the inside and lugs 5 on the outside for forming a tread. The annular elastic tire 1 basically includes a plurality of annular thin bands 4' in layers embedded therein which circumferentially extend and are spaced radially or in the direction of thickness of the track from one another with a predetermined interval.

In more detail, in order to form the thin bands 4, a single thin band 4' is spirally coiled to form circular layers shown as the first embodiment in FIG. 12, or a number of annular bands 4' having different diameters are concentrically arranged shown as the second embodiment in FIG. 13. The annular elastic track 1 made of a rubber and the annular thin bands 4 embedded therein are then vulcanized as a whole so as to join them to form an annular track. Cross and longitudinal-sectional views, FIGS. 10a and 10b illustrate the track of the first embodiment of the invention having two layers of the thin bands 4 made of a spirally coiled single bands, while cross and longitudinal-sectional views, FIGS. 11a and 11b illustrate the track of the second embodiment of the invention having a number of thin bands 4" having different diameters arranged in circular layers, respectively.

The annular thin bands 4 are made of a material comparatively high in toughness such as a glass fiber reinforced plastic material (GFRP), or a carbon fiber reinforced plastic material (CFRP), or a spring steel.

Moreover, the annular thin bands 4 may be divided into two groups on both the sides of the longitudinal center line of the annular elastic track as shown in FIG. 8, in order to give freedom in behavior to both the parts of the track to make them conform to respective road conditions. Further, a reinforcement layer 20 may be embedded in the rubber layer between the annular thin bands 4' as shown in FIGS. 10a and 10b. The reinforcement layer 20 preferably has a rigidity between those of the annular thin bands 4' and the rubber composition of the annular elastic track 1. In order to more improve the durability of the annular elastic track 1, low friction members 3 may be embedded in the sprocket-driven protrusions 2 to reinforce them. The low friction members 3 may be embedded in the protrusions 2 in a manner that their outer surfaces are in flush with those of the protrusions 2, or the surfaces of the frictional members 3 slightly extend beyond those of the protrusions 2.

FIG. 14a is a perspective view illustrating the annular elastic track 1 mounted on a service car in a running condition. The sprocket-driven protrusions 2 provided on the inner circumferential side of the annular elastic track 1 are driven by so-called cage-type sprockets 6 comprising two discs and a number of driving pins 18 connecting these discs shown by way of example in FIG. 14d. According to the invention, moreover, an annular elastic track may be provided with sprocket-driven protrusions 2 in two rows which are driven by drum-type sprockets 6 as shown in FIG. 14e. In order to prevent the sprocket-driven protrusions 2 from being dislodged from sprockets, there may be provided on the inner circumferential side of the track a series of protrusions as the case may be.

The lugs 5 on the outside may be arranged in a pattern such that lugs at opposite side of the center line extending in the circumferential direction are inclined in opposite direction to each other and staggered from each other in the circumferential direction as shown in FIG. 14b and may be arranged in a staggered block pattern as shown in FIG. 14c.

As can be seen from the above explanation, the annular elastic track 1 is subjected to repeated reciprocal bending to cause great shearing deformations. However, since these deformations are mainly in circumferential directions of the track, rubber parts of the track 1 between the thin plates 4 according to the invention will be also greatly deformed not causing deformations in width directions of the track which is otherwise caused in the prior art. Therefore, it is possible for the track 1 according to the invention to recover from the circumferential deformations without causing any inner breakage such as separations.

Moreover, the annular elastic track according to the invention exhibits a moderate rigidity and a high durability with a simple construction formed only by arranging thin plates of GFRP, or CFRP, or a spring steel in layers with a predetermined interval in a rubber and vulcanizing these components to form a unitary track. By providing the simple sprocket-driven protrusions on the track according to the invention, the cage-type driving sprockets or the like can be used to avoid the complicated construction of the prior art driving link chains provided on both sides of an annular elastic track by means of two driving sprockets. Therefore, the annular elastic track according to the invention makes lower the surface pressure acting upon the elastic track being driven to ensure the reasonable driving, avoiding any excessive load acting upon the track.

Moreover, by embedding in the rubber layer between the thin plates 4 a reinforcement layer having a rigidity whose value is between those of the annular thin plates 4 and the rubber composition of the annular elastic track, steep change in rigidity of the rubber between the embedded annular thin plates can be avoided. Further, by embedding low friction members 3 in the sprocket-driven protrusions 2 to reinforce them, the durability of the annular elastic track can be further improved.

FIG. 15 illustrates in an enlarged section the part of an annular elastic track to be used in a monocycle according to the invention. FIG. 16 is a cross-sectional view of the tire shown in FIG. 15. The annular elastic track 21 made of a rubber is formed in the outer circumference with six grooves 22 extending in longitudinal directions and on the inner circumference with a series of protrusions 23 spaced with a predetermined interval along the longitudinal center line. Four annular plates 24 made of a fiber reinforced plastic material are embedded in the annular elastic track 21 so as to extend in the longitudinal directions.

The annular elastic track 21 of the shown embodiment has, for example, a width of 100 mm and a thickness of 15 mm. The depth of the grooves 22 is 5 mm. The protrusions 23 have substantially a trapezoidal cross-section and a 36 mm width, a 40 mm length, and a 22 mm height. The protrusions 23 are arranged with an interval of 60 mm along the longitudinal center line of the track 21.

A sprocket wheel 25 is shown by way of example in a partially removed front elevation, FIG. 17 and a cross-sectional view, FIG. 18, which comprises a pair of annular members 26 and 27 and pins 28 connecting these annular members. The pins 28 are adapted to engage the protrusions 23 to transmit the driving force to the annular elastic track 21.

As an alternative, an annular elastic track 21 may be provided on its inner circumference with protrusions 23 in two rows (not shown), while a sprocket wheel 25 may be composed of a single annular member and pins 8 vertically extending from both surfaces of the single annular member (not shown) so as to engage the protrusions 23 in two rows to transmit the driving force to the annular elastic track 21.

Figure 19:
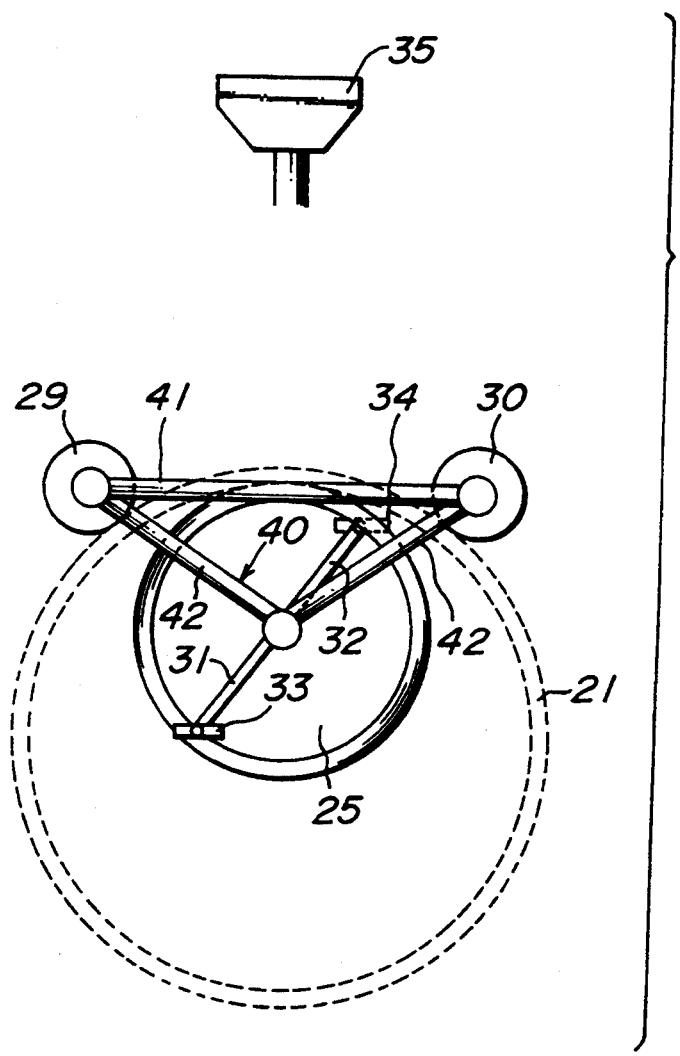
FIG. 19 is a side view illustrating a monocycle under no-load condition according to the first embodiment of the invention.
Figure 20:
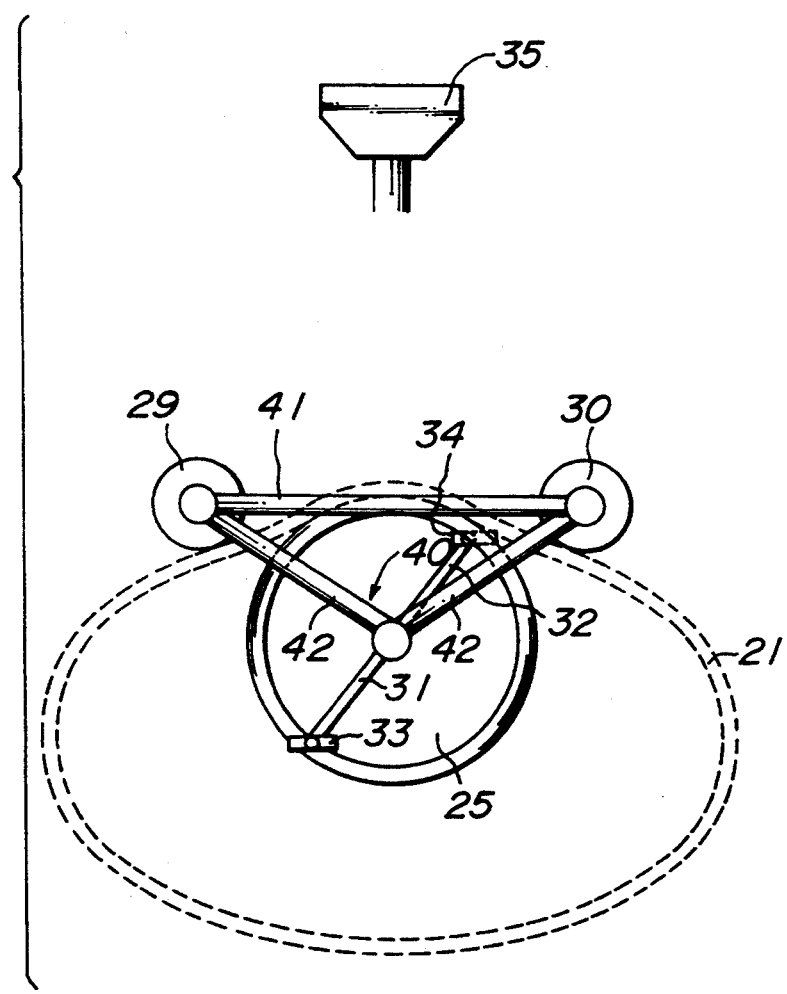
FIG. 20 is a side view illustrating the monocycle shown in FIG. 19 under a loaded condition of about 60 kg.

FIG. 19 illustrates in a side view a monocycle in unloaded condition according to the first embodiment of the invention which uses the annular elastic track 21 shown in FIG. 15. On the other hand, FIG. 20 shows the monocycle under a loaded condition when the saddle 35 supports a load of about 60 kg. As can be seen from these drawings, the annular elastic track 21 is substantially circular under the unloaded condition, while the annular elastic track 21 is flattened to an extent depending upon a load acting upon the saddle of the monocycle. Since the annular elastic track 21 has the elastic annular plates 24 embedded therein in the longitudinal directions, the track 21 has a great elasticity so that the elasticity of the track is maintained even if it is severely deformed upon being subjected to a heavy load.

Stationary rollers 29 and 30 are rotatably mounted on both ends of upper frame members 41 (only one shown in the drawings) of a triangular frame 40 to provide a constant distance between these rollers. These stationary rollers 29 and 30 are adapted to contact the outer circumference of the annular elastic track 21. A sprocket wheel 25 is rotatably mounted on the lower vertex of the triangular frame 40 at lower ends of the inclined frame members 42. The sprocket wheel 25 is in the annular elastic track 21 and adapted to engage the protrusions 23 on the inner circumference of the annular elastic track 21. The sprocket wheel 25 is provided with cranks 31 and 32 having pedals 33 and 34 at their respective free ends. A cyclist sits on the saddle 35 for balancing his weight. However, the saddle 35 may be dispensed with as the case may be.

When a cyclist rides on the monocycle, the annular elastic track 21 is deformed to a somewhat flattened shape keeping its elasticity as shown in FIG. 20 so that the inner circumference of the annular elastic track 21 is brought into firm contact with the sprocket wheel 25. On the other hand, the outer circumference of the annular elastic track 21 contact the stationary rollers 29 and 30 to support the load. When the cyclist pedals the monocycle with the pedals 33 and 34, the pins 28 of the sprocket wheel 25 engaging the protrusions 23 of the track 21 transmit the driving force to the annular elastic track 21 to drive the monocycle.

In the embodiment shown in FIGS. 19 and 20, the upper frame members 41 have a length of 45 cm and the inclined frame members 42 have a length of 27 cm. These frame members 41 and 42 form the inverted isosceles triangular frame 40 having the sprocket wheel 25 rotatably mounted on its vertex and the stationary rollers 29 and 30 rotatably mounted on the ends of the upper frame members 41.

Figure 21:
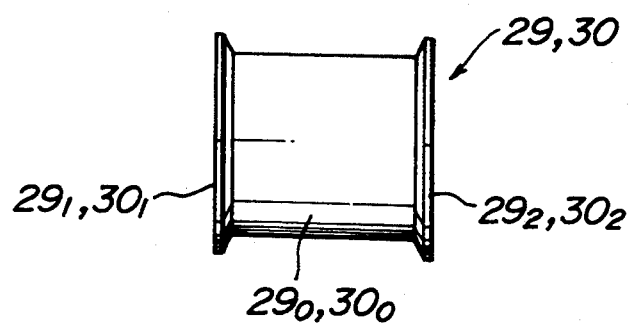
FIG. 21 is a front view illustrating a stationary roller used in the monocycle shown in FIG. 19 or 20.

FIG. 21 illustrates the stationary roller 29 or 30 comprising a shaft $29_0$ or $30_0$ formed at its ends with flanges $29_1$ and $29_2$ or $30_1$ and $30_2$ which hold the annular elastic track 21 therebetween and prevent it from being dislodged to ensure the smooth drive of the annular elastic track 21 by the rotation of the shaft $29_0$ or $30_0$. In this embodiment, the shaft $29_0$ or $30_0$ has a diameter of 10 cm and a length of 11 cm, while the flanges $29_1$ and $29_2$ or $30_1$ and $30_2$ have a diameter of 12 cm.

Figure 22:
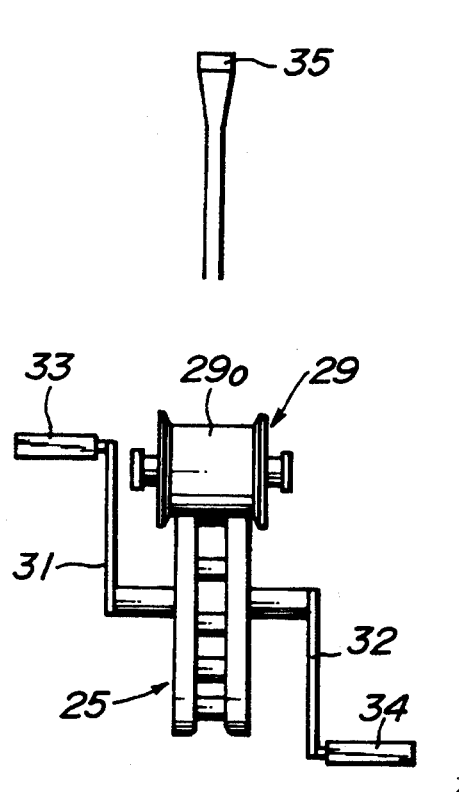
FIG. 22 is a front view illustrating the monocycle shown in FIG. 19 after removal of the annular elastic track.

FIG. 22 illustrates in a front elevation the monocycle shown in FIGS. 19 and 20, after removal of the annular elastic track 21. When the cyclist pedals at 33 and 34 on the monocycle, the sprocket wheel 25 is rotated so that the annular elastic track 21 is driven in one direction with the aid of the stationary rollers 29 and 30.

As described above, the monocycle according to the invention has a wide contact area of the annular elastic track 21 with a road, as a result of which stability of the monocycle can be greatly improved in comparison with those of the prior art. Moreover, because the annular elastic track used in the monocycle has a higher elasticity, the monocycle can exhibit the high jumping faculty.

Figure 23:
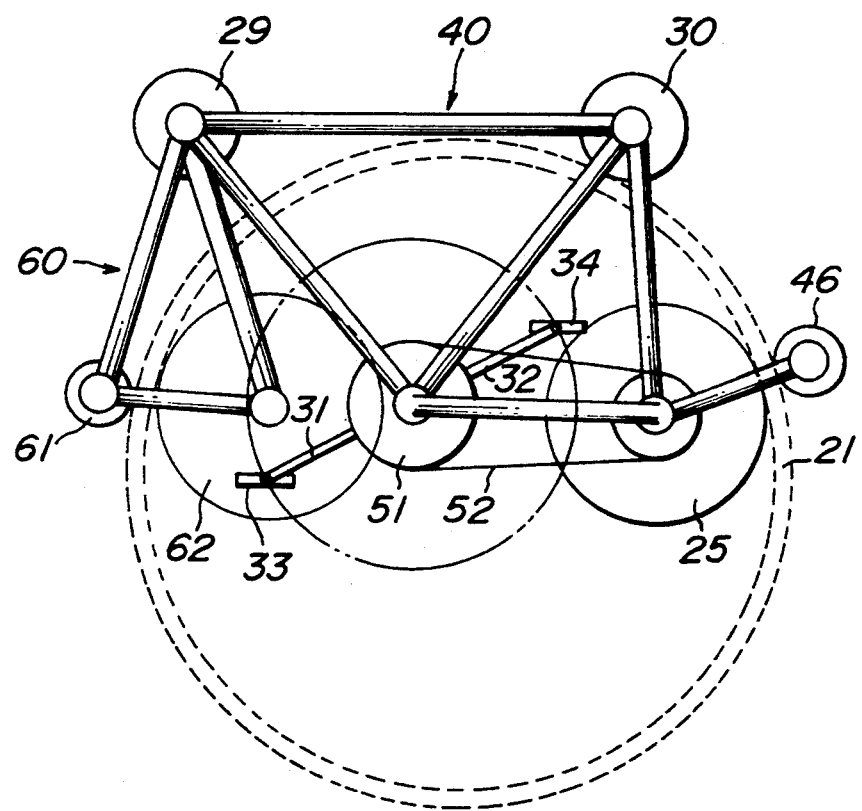
FIG. 23 is a side view illustrating a monocycle under no-load condition according to the second embodiment of the invention.
Figure 24:
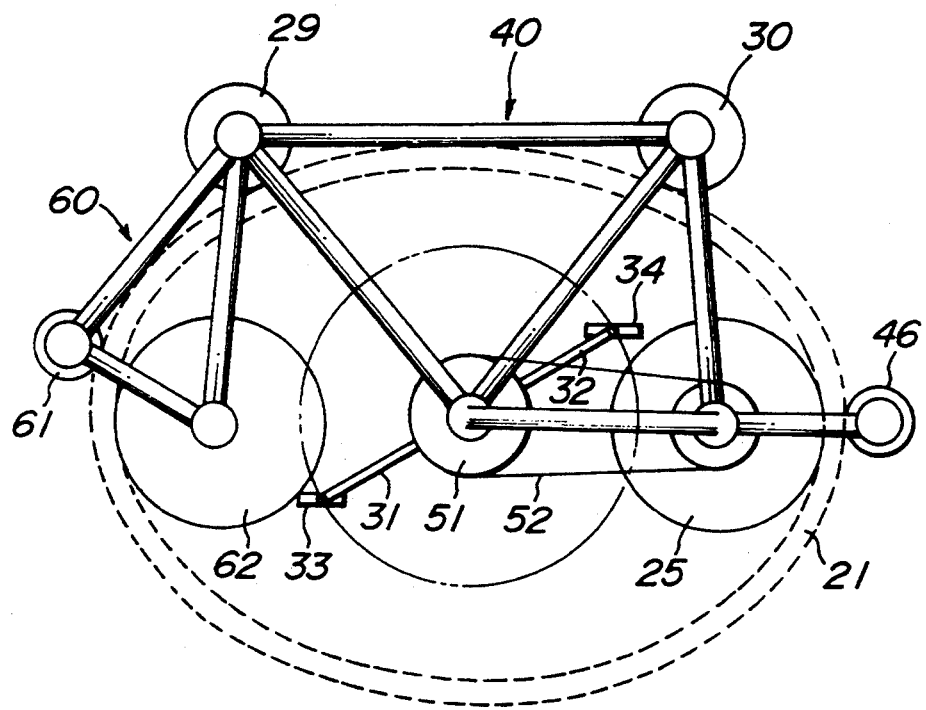
FIG. 24 is a side view illustrating the monocycle shown in FIG. 23 under a loaded condition of about 60 kg.

FIGS. 23 to 25 illustrate in side view the monocycle according to the second embodiment of the invention, which is in unloaded condition in FIG. 23, in the loaded condition of about 60 kg in FIG. 24, and in subjected to the load of about 120 kg in FIG. 25. As can be seen from these drawings, the annular elastic track 21 is substantially circular under the unloaded condition, while the annular elastic track 21 is flattened to an extent depending upon a load acting upon the saddle of the monocycle.

In the drawings, stationary rollers 29 and 30 are rotatably mounted on both ends of the upper frame members of a quadrilateral frame 40 comprising two triangular frames so as to provide a constant distance between these rollers. These stationary rollers 29 and 30 are adapted to contact the outer circumference of the annular elastic track 21. A chain wheel 51 is rotatably mounted on the lower vertex of one triangular frame of the quadrilateral frame 40 in the annular elastic track 21 and provided with cranks 31 and 32 having pedals 33 and 34 at their respective free ends.

A sprocket wheel 25 is rotatably mounted on one vertex of the other triangular frame of the quadrilateral frame 40 so as to contact the inner circumference of the annular elastic track 21. A chain 52 extends around the chain wheel 51 and the chain wheel provided at one end of the sprocket wheel 25. A cyclist pedals the monocycle with the pedals 33 and 34, the sprocket wheel 25 engaging the protrusions 23 of the annular elastic track 21 is rotated through the chain 52 to transmit the driving force to the annular elastic track 21 to drive the monocycle.

A triangular swinging frame 60 is pivotally mounted on the quadrilateral frame 40 concentrically to the stationary roller 29. A stationary roller 61 is rotatably mounted on one vertex of the triangular swinging frame 60 so as to be located outside of the annular elastic track 21 and an idler 62 is rotatably mounted on the remaining vertex of the frame 60 so as to be located inside of the annular elastic track 21 to embrace it between the stationary roller 61 and the idler 62. The stationary roller 61 has a length longer than the width of the annular elastic track 21 and serves to restrain its outer circumference.

FIG. 26 illustrates in side view the monocycle according to second embodiment of the invention, showing only the quadrilateral frame 40 with stationary rollers 29 and 30 and chain and sprocket wheels 51 and 25. Stationary rollers 29 and 30 are rotatably mounted on both the ends of the upper frame members 41. A chain wheel 51 is rotatably mounted on the jointed portion of front and rear inclined frame members 42 and 43. A triangular frame is formed by the rear inclined frame members 43, lower frame members 44 and vertical frame members 45. A sprocket wheel 25 is rotatably mounted on the jointed portion of the lower and vertical frame members 44 and 45. Although the monocycle of the embodiment shown in FIGS. 23 to 26 is somewhat complicated, the dislodgement of annular elastic track from the monocycle is remarkably prevented and the riding comfortability is also improved.

FIG. 27 conceptionally illustrates the monocycle according to the third embodiment of the invention. In this embodiment, two stationary rollers 29 and 30 are arranged outside the annular elastic track 21, while a sprocket wheel 25 is arranged between the stationary rollers 29 and 30 in the annular elastic track 21. A chain 52 extends around the sprocket wheel 25 and a chain wheel 51. The construction of the monocycle is advantageously simplified, although the annular elastic track 21 exhibits somewhat high resistance when it is deformed.

Figure 28:
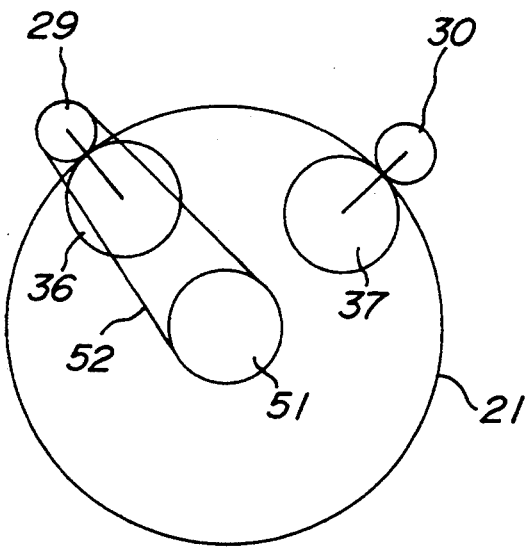
FIG. 28 is a conceptual view illustrating a monocycle according to the fourth embodiment of the invention.

FIG. 28 conceptionally illustrates the monocycle according to the fourth embodiment of the invention. In this embodiment, two stationary rollers 29 and 30 are arranged outside the annular elastic track 21, while movable rollers 36 and 37 are arranged inside the track 21 in opposition to the stationary rollers, respectively. One of the stationary rollers, for example, the roller 29 also serves as a sprocket wheel 25. A chain 52 extends around the sprocket wheel, that is, the movable roller 29 and a chain wheel 51.

Figure 29:
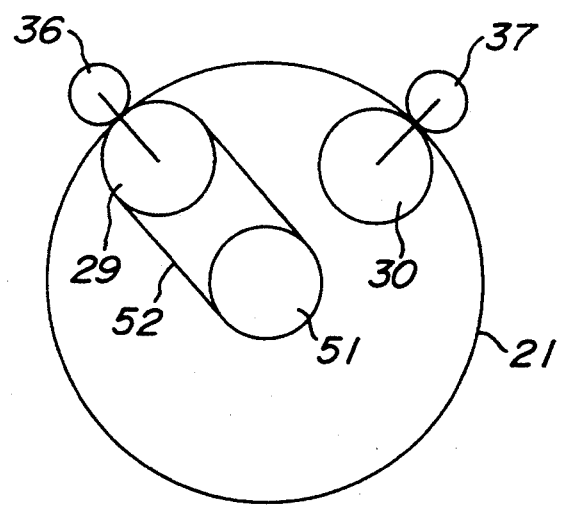
FIG. 29 is a conceptual view illustrating a monocycle according to the fifth embodiment of the invention.

FIG. 29 conceptionally illustrates the monocycle according to the fifth embodiment of the invention. In this embodiment, two stationary rollers 29 and 30 are arranged inside the annular elastic track 21, while movable rollers 36 and 37 are arranged outside the track 21 in opposition to the stationary rollers 29 and 30, respectively. One of the stationary rollers, for example, the roller 29 also serves as a sprocket wheel. A chain 52 extends around the sprocket wheel, that is, the movable roller 29 and a chain wheel 51. With this embodiment, the movable rollers 36 and 37 swing around the stationary rollers 29 and 30, respectively.

With the arrangement described above according to the invention, the wide contact area of the annular elastic track with a road provides the stability of the monocycle which greatly contributes to rapid progress in training of monocycle riding. Moreover, the spring action of the annular elastic track can easily overcome any bumpy roads and provides jumping performance of the monocycle. Further, the annular elastic track does not require to fill with pressurized air, the monocycle according to the invention needs no maintenance.

While the invention has been particularly shown and described with reference to preferred embodiments thereof, it will be understood by those skilled in the art that the foregoing and other changes in form and details can be made therein without departing from the scope of the claims.

What is claimed is:

1. An annular elastic track having sprocket-driven protrusions on its inner circumference and lugs on the outer circumference and made of a rubber-like material, said track comprising; a first spirally formed thin band continuously extending in its circumferential direction and having coils spaced radially from one another with a predetermined interval and embedded in the track in the circumferential direction to cover an upper side, a lower side and opposite lateral sides of the thin band with said rubber-like material.

2. The annular elastic tracks as set forth in claim 1, wherein the rubber-like material located between the coils has a thickness corresponding to 0.5–2.0 times of a thickness of the thin band.

3. The annual elastic track of claim 1 further comprising a second thin spirally wound band, said first and second spirally wound bands positioned on opposite sides of a longitudinal center line of said elastic track.

4. An annular elastic track having sprocket-driven protrusions on its inner circumference and lugs on the outer circumference and made of rubber-like material, said track comprising; a plurality of annular thin bands having different diameters and spaced radially from one another with a predetermined interval and continuously embedded in the track in the circumferential direction to cover an upper side, a lower side and opposite lateral sides of each of the annular thin bands with said rubber-like material.

5. The annular elastic track as set forth in claim 4, wherein the rubber-like material located between the annular thin bands has a thickness corresponding to 0.5–2.0 times of a thickness of a single annular to thin band.

6. The annular elastic track as set forth in claim 4, wherein said annular thin plates are made of a material selected from a glass fiber reinforced material, a carbon fiber reinforced material and a spring steel.

7. The annular elastic track of claim 4 further comprising a second plurality of annular thin bands continuously extending in said circumferential direction, said plurality of annular thin bands and said second plurality of annular thin bands positioned on opposite sides of a longitudinal center line of said elastic track.

8. The annular elastic track as set forth in claim 4, wherein said sprocket-driven protrusions are provided in plural rows.

9. The annular elastic track as set forth in claim 4, wherein said sprocket-driven protrustions are provided with low friction members embedded therein for reinforcing the protrusions.

10. The annular elastic track as set forth in claim 4, wherein said track comprises at least one reinforcement layer embedded in the rubber-like material of the main body of the track between the annular thin bands.

11. The annular elastic track as set forth in claim 4, wherein said lugs on the outer circumference are arranged in a pattern such that each of lugs is continuously extended in the circumferential direction.

12. The annular elastic track as set forth in claim 4, wherein said lugs on the outer circumference are arranged in a pattern such that lugs at opposite sides of the center line extending in the circumferential direction are inclined in opposite directions to each other and staggered from each other in the circumferential direction.

13. The annular elastic track as set forth in claim 4, wherein said lugs on the outer circumference are arranged in a staggered block pattern.

* * * * *